United States Patent
Banks et al.

(10) Patent No.: US 9,303,703 B2
(45) Date of Patent: Apr. 5, 2016

(54) BRACKET ASSEMBLY FOR MOUNTING A BRAKE ASSEMBLY AND BRAKE ACTUATOR

(71) Applicant: Bendix Spicer Foundation Brake LLC, Elyria, OH (US)

(72) Inventors: Daniel E. Banks, Climax, MI (US); Troy A. Flodin, Caledonia, MI (US); Bradley T. Wistinghausen, Kalamazoo, MI (US); Thomas L. Runels, Battle Creek, MI (US); Brian St. John, Charlotte, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 14/327,179

(22) Filed: Jul. 9, 2014

(65) Prior Publication Data
US 2016/0010709 A1   Jan. 14, 2016

(51) Int. Cl.
*F16D 65/00*   (2006.01)
*F16D 51/18*   (2006.01)
*F16D 51/00*   (2006.01)
*F16D 65/09*   (2006.01)
*F16D 65/22*   (2006.01)
*F16D 125/30*   (2012.01)

(52) U.S. Cl.
CPC ............ *F16D 65/0056* (2013.01); *F16D 51/18* (2013.01); *F16D 65/09* (2013.01); *F16D 65/22* (2013.01); *F16D 2051/003* (2013.01); *F16D 2125/30* (2013.01)

(58) Field of Classification Search
CPC ... F16D 2051/003; F16D 65/22; F16D 65/09; F16D 2125/30; F16D 51/18; F16D 65/0056
USPC ........... 188/325, 329, 330, 328, 250 R, 250 B
See application file for complete search history.

(56) References Cited

U.S. PATENT DOCUMENTS

| | | | | |
|---|---|---|---|---|
| 2,331,652 A | * | 10/1943 | Buckendale | 188/205 R |
| 3,300,231 A | * | 1/1967 | Luli et al. | 280/796 |
| 4,337,851 A | * | 7/1982 | Pringle | 188/330 |
| 4,526,254 A | * | 7/1985 | Baltare | 188/341 |
| 4,754,857 A | | 7/1988 | Urban | |
| 4,838,389 A | * | 6/1989 | Mamery | 188/78 |

(Continued)

*Primary Examiner* — Robert A Siconolfi
*Assistant Examiner* — Charles Poon
(74) *Attorney, Agent, or Firm* — Reising Ethington P.C.

(57) ABSTRACT

An improved bracket assembly for receiving a brake assembly and a brake actuator is provided. The bracket assembly includes a tube configured to receive a camshaft of the brake assembly and an actuator mounting bracket disposed proximate a first end of the tube. The actuator mounting bracket is configured for coupling to the actuator and defines an aperture configured to receive the tube. The bracket assembly further includes a brake spider mounting bracket disposed proximate a second end of the tube. The spider mounting bracket includes a body defining inboard and outboard sides, is configured to receive a brake spider on the outboard side and defines an aperture configured to allow the tube to extend therethrough. The spider mounting bracket further includes a neck extending from the inboard side of the body that is configured to receive the tube and positions the weld away from the body to reduce stress.

19 Claims, 4 Drawing Sheets

(56) References Cited

U.S. PATENT DOCUMENTS

| | | | | |
|---|---|---|---|---|
| 4,854,427 A | * | 8/1989 | Baroni | 188/205 R |
| 5,062,506 A | * | 11/1991 | White | 188/329 |
| 5,887,687 A | * | 3/1999 | Williams | 188/330 |
| 5,964,325 A | * | 10/1999 | Davison et al. | 188/330 |
| 6,089,361 A | * | 7/2000 | Davison et al. | 188/206 R |
| 2009/0101457 A1 | * | 4/2009 | Gonska et al. | 188/18 R |
| 2009/0107786 A1 | * | 4/2009 | Eveley | 188/325 |
| 2013/0275018 A1 | * | 10/2013 | Todd et al. | 701/70 |

* cited by examiner

BRACKET ASSEMBLY FOR MOUNTING A BRAKE ASSEMBLY AND BRAKE ACTUATOR

BACKGROUND OF THE INVENTION a. Field of the Invention

This invention relates to vehicle brakes. In particular, the invention relates to a bracket assembly for mounting a brake assembly and a brake actuator that reduces mechanical stress within the bracket assembly as compared to conventional bracket assemblies.

b. Background Art

In a conventional drum brake, a brake drum rotates with a wheel or wheels proximate to one end of an axle. The drum defines a radially inner braking surface. A brake spider is disposed about the axle and a pair of brake shoes are pivotally mounted at one end to the brake spider. The opposite end of each brake shoe is engaged by an actuating member such as a cam to move the brake shoes between positions of engagement and disengagement with the braking surface of the brake drum. The cam is driven by a brake actuator acting on one end of a camshaft supporting the cam.

Referring to FIGS. 1-2, in one conventional drum brake, a bracket assembly 10 supports various components of a brake assembly 12 and a brake actuator 14 and positions them relative to one another. The bracket assembly 10 includes a tube 16 through which the camshaft 18 extends and mounting brackets 20, 22 welded to either end of the tube 16 and configured for coupling to the brake actuator 14 and a brake spider 24, respectively. Dynamic vertical loads placed on the bracket 20 supporting the brake actuator 14 cause stress at the weld between the bracket 22 and the tube 16. This stress can lead to fracture of the weld. In order to reduce the stress at the weld and potential failure of the weld, a support 26 must be installed between the vehicle axle 28 and the tube 16. Although this support 26 reduces stress at the weld between tube 16 and bracket 22, stress then becomes concentrated at the weld between tube 16 and bracket 20. In order to reduce stress on this weld, a gusset 30 must be installed between tube 16 and bracket 20. The addition of support 26 and gusset 30 increases the complexity of assembly and the cost of the braking system. In another configuration, a pair of gussets (not shown) may be installed between tube 16 and bracket 22. In this configuration, however, the weld between the tube 16 and bracket 22 is still located in a high stress area and subject to failure. Further, the configuration again increases the complexity of assembly and the cost of the braking system and may further require the support 26 and gusset 30 shown in FIGS. 1-2.

The inventors herein have recognized a need for a bracket assembly for mounting a brake assembly and a brake actuator that will minimize and/or eliminate one or more of the above-identified deficiencies.

BRIEF SUMMARY OF THE INVENTION

This invention relates to vehicle brakes. In particular, the invention relates to a bracket assembly for receiving a brake assembly, which includes a brake spider, and a brake actuator that reduces mechanical stress within the bracket assembly as compared to conventional bracket assemblies.

A bracket assembly for receiving a brake assembly and a brake actuator in accordance with one embodiment of the invention includes a tube configured to receive a camshaft of the brake assembly. The bracket assembly further includes an actuator mounting bracket disposed proximate a first end of the tube. The actuator mounting bracket is configured for coupling to the actuator and defines an aperture configured to receive the tube. The bracket assembly further includes a brake spider mounting bracket disposed proximate a second end of the tube. The brake spider mounting bracket includes a body defining inboard and outboard sides. The body is configured to receive a brake spider on the outboard side and defines an aperture configured to allow the tube to extend therethrough. The brake spider mounting bracket further includes a neck extending from the inboard side of the body, the neck configured to receive the tube.

A brake and bracket assembly in accordance with one embodiment of the invention includes a brake assembly. The brake assembly includes a brake spider and first and second brake shoes having first ends coupled to the brake spider. The brake assembly further includes a camshaft extending through the brake spider and having a cam at a first end configured to engage second ends of the first and second brake shoes. Rotation of the cam causes the first and second brake shoes to move between positions of engagement and disengagement with a braking surface. The brake and bracket assembly further includes a bracket assembly for receiving the brake assembly and a brake actuator. The bracket assembly includes a tube configured to receive the camshaft. The bracket assembly further includes an actuator mounting bracket disposed proximate a first end of the tube. The actuator mounting bracket is configured for coupling to the actuator and defines an aperture configured to receive the tube. The bracket assembly further includes a brake spider mounting bracket disposed proximate a second end of the tube. The brake spider mounting bracket includes a body defining inboard and outboard sides. The body is configured to receive the brake spider on the outboard side and defines an aperture configured to allow the tube to extend therethrough. The brake spider mounting bracket further includes a neck extending from the inboard side of the body. The neck is configured to receive the tube.

A bracket assembly for mounting a brake assembly and a brake actuator in accordance with the invention represents an improvement as compared to conventional bracket assemblies. In particular, the geometry of the brake spider mounting bracket allows the weld between the brake spider mounting bracket and the tube to be moved further inboard away from the body of the brake spider mounting bracket. This configuration reduces stress on the weld and reduces the requirement for the external support and gussets required in the conventional bracket assembly shown in FIGS. 1-2 resulting in simplification of the assembly process and a reduction in cost.

The foregoing and other aspects, features, details, utilities, and advantages of the present invention will be apparent from reading the following description and claims, and from reviewing the accompanying drawings.

DETAILED DESCRIPTION OF THE INVENTION

Figure 3:
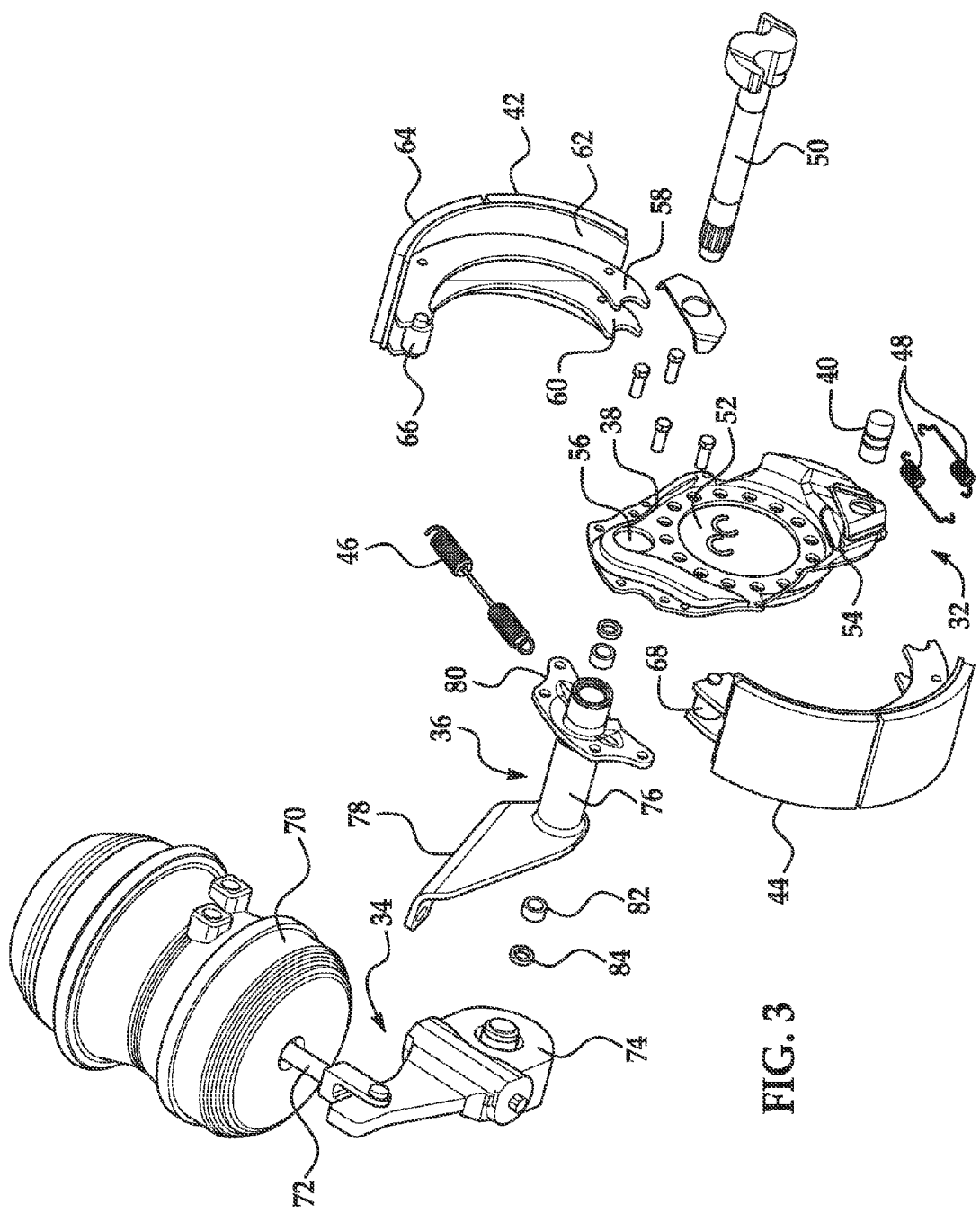
FIG. 3 is an exploded view of a brake assembly, a brake actuator and a bracket assembly for mounting the brake assembly and brake actuator in accordance with one embodiment of the present invention.

Referring now to the drawings wherein like reference numerals are used to identify identical components in the various views, FIG. 3 illustrates a brake 32, a brake actuator 34 and a bracket assembly 36 for mounting the brake 32 and brake actuator 34 in accordance with one embodiment of the present invention.

Brake 32 is provided to halt rotation of one or more vehicle wheels. Brake 32 is particularly adapted for use in heavy vehicles. It should be understood, however, that brake 32 may be used on a wide variety of vehicles and in non-vehicular applications. Brake 32 is configured to act against an annular brake drum (not shown) that rotates with the vehicle wheel or wheels at one end of an axle (not shown). Brake 32 may include a brake spider 38, an anchor pin 40, brake shoes 42, 44, return and retaining springs 46, 48, and a camshaft 50.

Spider 38 is provided to mount the various components of brake 32. Spider 38 defines a central aperture 52 through which the vehicle axle may extend. Spider 38 may further define bores 54, 56, on either side of aperture 52 configured to receive anchor pin 40 and camshaft 50.

Anchor pin 40 is provided to pivotally mount brake shoes 42, 44 to brake spider 38. Anchor pin 40 may comprise a round pin and may be received within bore 54 of spider 38.

Brake shoes 42, 44 are provided for selective engagement with a braking surface of a drum (not shown) in order to apply a braking torque to the drum and one or more vehicle wheels. Each brake shoe 42, 44 may include a pair of spaced webs 58, 60, a brake table 62, and one or more brake linings 64. Webs 58, 60 support brake table 62 and may extend generally parallel to one another. Webs 58, 60 may be made from metals and metal alloys such as steel. Webs 58, 60 are arcuate in shape and extend between opposite ends of brake shoes 42, 44. Webs 58, 60 may be secured to brake table 62 using welds or other conventional fastening means. Each web 58, 60 may define semicircular recesses at either end configured to receive pin 40 and a corresponding one of cam followers 66, 68. Webs 58, 60 may also provide a connection point for return spring 46 and retaining springs 48. Brake table 62 is provided to support brake linings 64. Table 62 may be made from conventional metals and metal alloys including steel and may be arcuate in shape. Brake linings 64 are provided for frictional engagement with the braking surface of the drum. Linings 64 may be made from conventional friction materials. Brake linings 64 may be secured to brake table 62 using a plurality of rivets or other conventional fasteners.

Return spring 46 is provided to bias brake shoes 42, 44 to a position of disengagement from the braking surface. Retainer springs 48 are provided to retain brake shoes 42, 44—and particularly webs 58, 60—on anchor pin 40. Springs 46, 48 are conventional in the art. The ends of springs 46, 48 extend through corresponding apertures in webs 58, 60 of brake shoes 42, 44.

Camshaft 50 is provided to cause movement of brake shoes 42, 44 between positions of engagement with and disengagement from the braking surface of the drum. In the illustrated embodiment, camshaft 50 includes a conventional doubled lobed S-cam actuator 18. Cam followers 66, 68 follow the surface of the cam as it rotates thereby causing shoes 42, 44 to pivot about an axis defined by anchor pin 40. The opposite end of camshaft 50 is configured for coupling to brake actuator 34.

Brake actuator 34 is provided to cause rotation of camshaft 50 in order to apply or release brake 32. Actuator 34 is conventional in the art and may include a fluid chamber 70 and a pushrod 72 extending from chamber 70. Pushrod 72 is configured to engage a conventional slack adjuster 74 coupled to one end of camshaft 50. Fluid flow within chamber 70 is controlled to cause linear movement of pushrod 72 which is translated into rotational movement of camshaft 50 by slack adjuster 74 to apply and release brake 32.

Bracket assembly 36 is provided to mount brake 32 and brake actuator 34 and position brake 32 and actuator 34 relative to one another. Assembly 36 includes a camshaft tube 76, an actuator mounting bracket 78 and a brake spider mounting bracket 80.

Tube 76 houses camshaft 50 and protects camshaft 50 from external objects and elements. Tube 76 is cylindrical in shape and is configured to receive bushings 82 in each longitudinal end that are disposed about camshaft 50 and permit rotation of camshaft 50 relative to tube 76. Tube 76 is also configured to receive grease seals 84 in each longitudinal end to prevent loss of lubricating grease from within tube 76.

Figure 4:
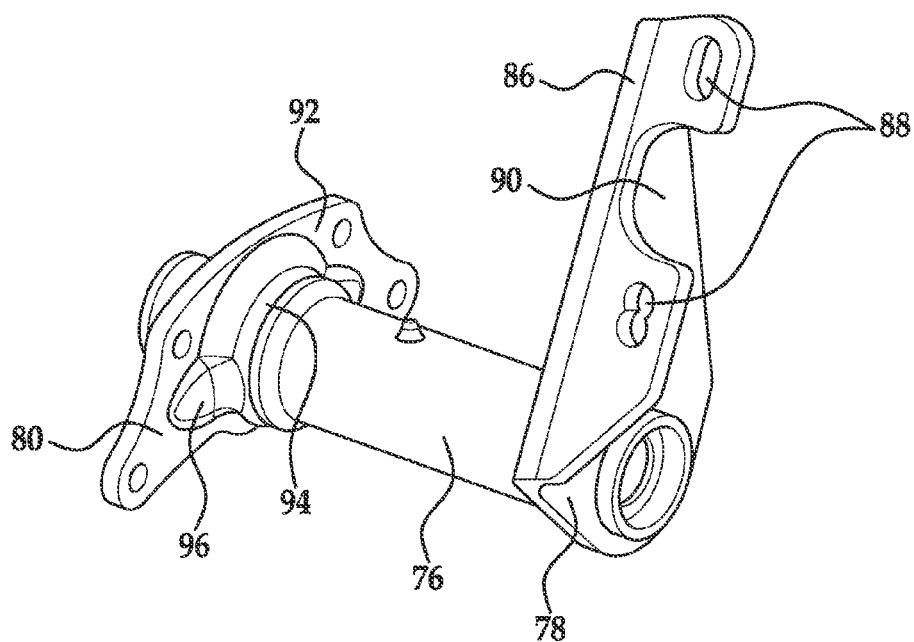
FIGS. 4-5 are perspective views of a bracket assembly in accordance with one embodiment of the present invention.
Figure 5:
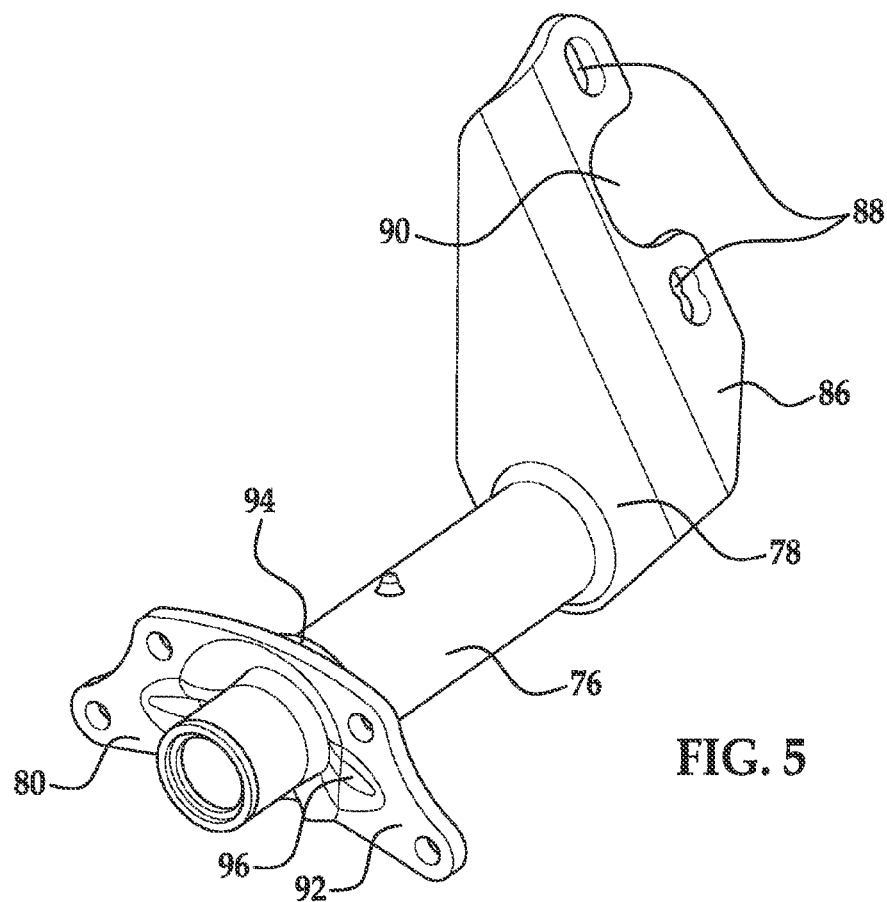

Referring now to FIGS. 4-5, actuator mounting bracket 78 is provided for mounting brake actuator 34. Bracket 78 is disposed proximate an inboard end of tube 76 and defines an aperture configured to receive tube 76 and through which the inboard end of tube 76 may extend. Although the aperture completely circumscribes tube 76 in the illustrated embodiment, it should be understood that the aperture may circumscribe only a portion of the circumference of tube 76. Bracket 78 may be joined to tube 76 through a circumferential weld. Bracket 78 is configured for coupling to actuator 34. In particular, bracket 78 defines a flange 86 having one or more bores 88 configured to receive fasteners used to couple fluid chamber 70 to bracket 78. Flange 86 further defines a notch 90 between bores 88 through which pushrod 72 may extend to engage slack adjuster 74.

Brake spider mounting bracket 80 is provided to receive brake spider 38. Bracket 80 is disposed proximate the outboard end of tube 76. Bracket 80 includes a body 92, a neck 94 and one or more ribs 96. Body 92, neck 94 and ribs 96 may form a unitary structure with bracket 80 formed from a metal blank through a drawing process in which the edges of the blank are restrained and a center section if forced by a punch into a die to form neck 94 and ribs 96. Forming bracket 80 in this manner as a unitary structure moves the welded joint further away from the potential failure points in bracket 80. It should be understood that bracket 80 could be formed through other methods including casting, forging or three-dimensional printing.

Figure 6:
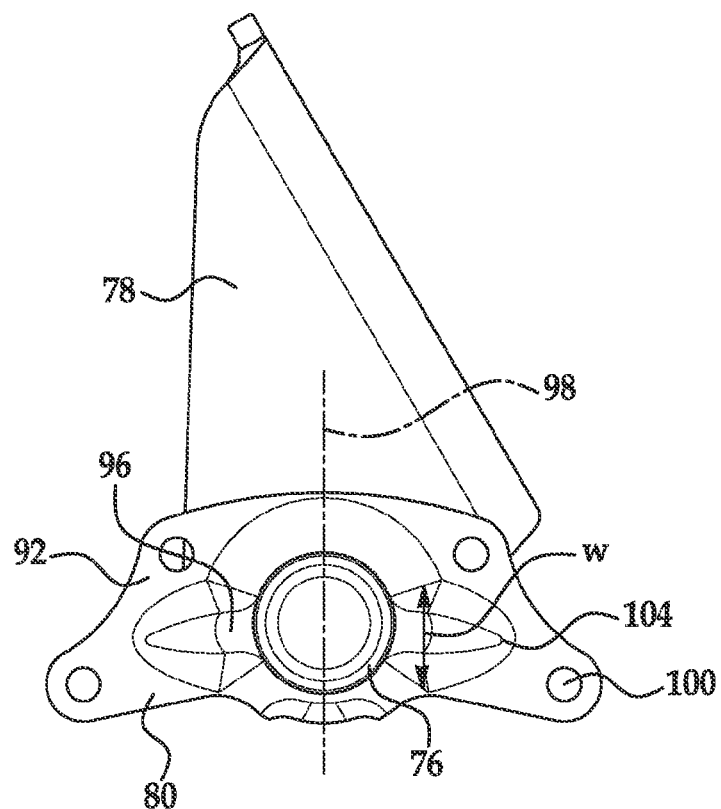
FIG. 6 is an end view of the bracket assembly of FIGS. 4-5.

Referring now to FIG. 6, body 92 may be substantially trapezoidal in shape and may be symmetrical in shape about a vertical plane 98 containing the axis of rotation of camshaft 50. It should be understood, however, that the configuration of body 92 may vary depending on the configuration of spider 38. Body 92 defines bores 100 proximate each "corner" configured to receive fasteners (not shown) used to couple spider 38 to bracket 80. In the illustrated embodiment, body 92 includes two bores 100 on either side of plane 98. It should be understood, however, that the pattern of bores will vary depending on the configuration of spider 38. Further, it should be understood that bracket 80 and spider 38 may be attached using other fastening methods including welds, rivets, etc. Body 92 further defines inboard and outboard sides. Body 92 is configured to receive spider 38 on the outboard side. Body 92 defines a central aperture that may be centered on the axis of rotation of camshaft 50. The aperture is configured to receive an outboard end of tube 76 and to allow tube 76 and camshaft 50 to extend therethrough. Although the aperture completely circumscribes tube 76 in the illustrated embodiment, it should be understood that the aperture may circumscribe only a portion of the circumference of tube 76.

Figure 7:
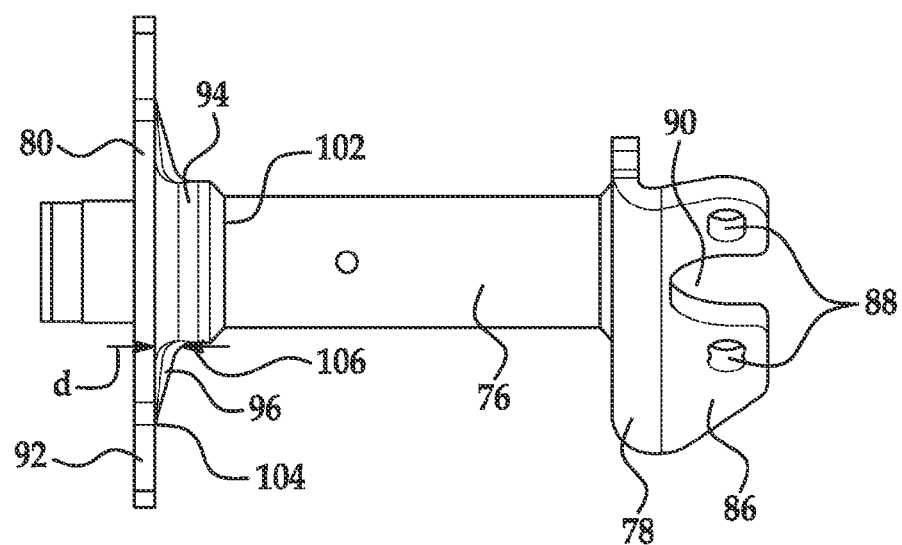
FIG. 7 is a top view of the bracket assembly of FIGS. 4-6.

Referring now to FIG. 7, neck 94 extends from the inboard side of body 92 and is configured to receive tube 76. The outer diameter of neck 94 may vary along its length. Neck may extend, for example from between about one millimeter to one hundred millimeters from body 92 and extends about twenty-five millimeters from body 92 in one embodiment. Neck 94 may be joined to tube 76 through a circumferential weld 102 at an inboard end of neck 94. Alternatively, or in addition, neck 94 may be joined to tube 76 through a weld at an outboard end of neck 94. Although weld 102 completely circumscribes tube 76 in the illustrated embodiment, it should be understood that the weld 102 may circumscribe only a portion of the circumference of tube 76. In accordance with one aspect of the invention, neck 94 allows weld 102 to be located further inboard than in conventional bracket assemblies and distant from body 92. By locating weld 102 further inboard and away from body 92, the stress on weld 102 from dynamic vertical loading is reduced.

Ribs 96 provide increased strength to bracket 80 and further reduce stress at weld 102. It should be understood, however, that ribs 96 may be omitted from bracket 80. Each of ribs 96 has a first end 104 contacting, and extending from, the inboard side of body 92 and a second end 106 contacting a point located along neck 94 distant from body 92. Ends 106 of ribs 96 may contact neck 94 at points that are intermediate the inboard and outboard ends of neck 94. The depth d of each rib 96 may continually increase moving from end 104 on body 92 to end 106 on neck 94. Referring to FIG. 6, the width w of each rib 96 may also continually increase moving from end 104 on body 92 to end 106 on neck 94. Ribs 96 may be circumferentially spaced less than one hundred and eighty degrees about neck 94. Accordingly, ribs 96 may join neck 94 at points that are not diametrically opposite from one another.

Figure 1:
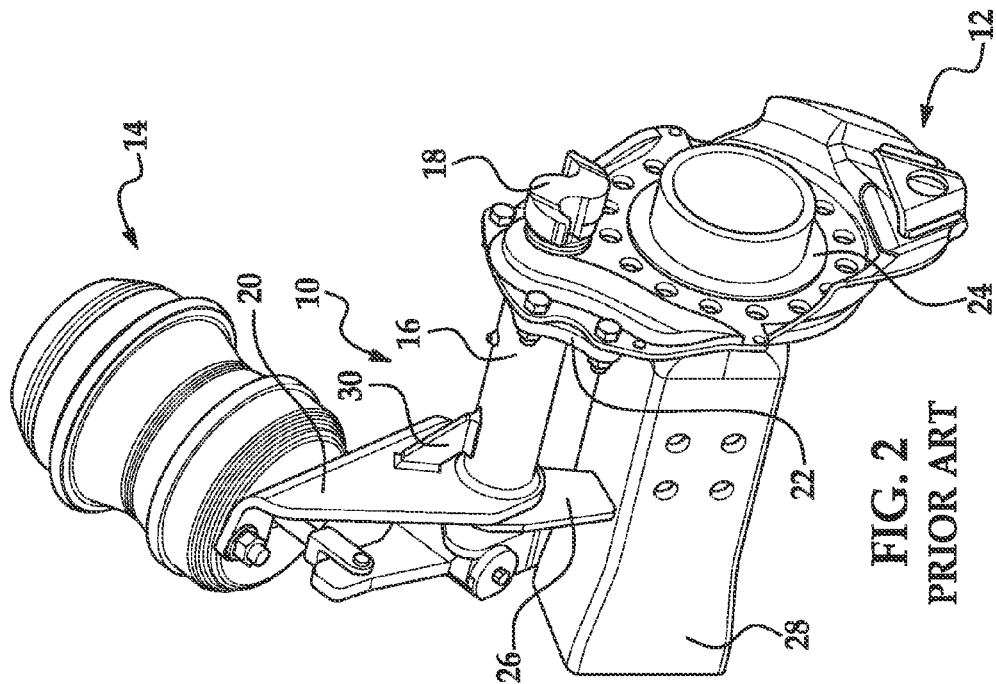
FIGS. 1-2 are perspective views of a prior art bracket assembly for mounting a brake assembly and a brake actuator.
Figure 2:
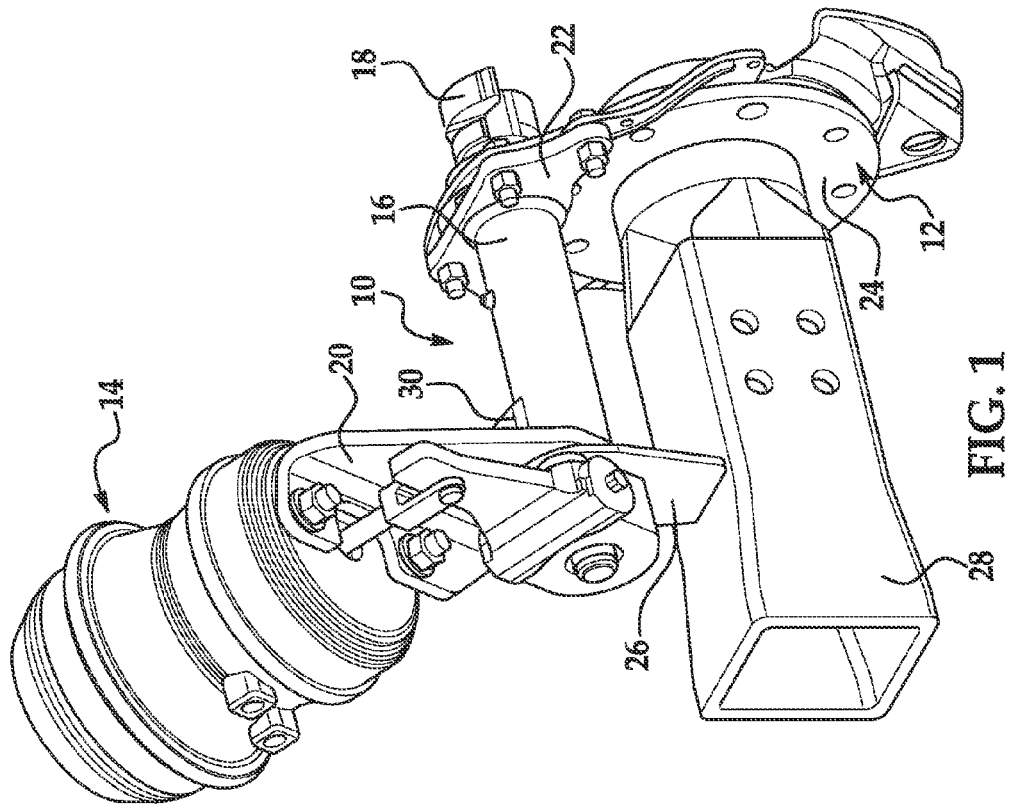

A bracket assembly 36 for mounting a brake 32 and a brake actuator 34 in accordance with the present invention represents an improvement relative to conventional bracket assemblies. The geometry of the brake spider mounting bracket 80 of the bracket assembly 36 allows the weld 102 between the brake spider mounting bracket 80 and the camshaft tube 76 to be moved further inboard away from the body 92 of the brake spider mounting bracket 80. This configuration reduces stress on the weld 102 and reduces the requirement for the external support and gussets required in the conventional bracket assembly shown in FIGS. 1-2 resulting in simplification of the assembly process and a reduction in cost.

While the invention has been shown and described with reference to one or more particular embodiments thereof, it will be understood by those of skill in the art that various changes and modifications can be made without departing from the spirit and scope of the invention.

What is claimed is:

1. A bracket assembly for receiving a brake assembly and a brake actuator, comprising:
 a tube configured to receive a camshaft of the brake assembly;
 an actuator mounting bracket disposed proximate a first end of said tube, said actuator mounting bracket configured for coupling to said actuator and defining an aperture configured to receive said tube; and,
 a brake spider mounting bracket disposed proximate a second end of said tube, said brake spider mounting bracket including:
  a body defining inboard and outboard sides, said body configured to receive a brake spider on said outboard side and defining an aperture configured to allow said tube to extend therethrough; and,
  a neck extending from said inboard side of said body, said neck configured to receive said tube
 wherein said brake spider mounting bracket is joined to said tube with a weld at an inboard end of said neck distant from said body and said neck is not welded to said body.

2. The bracket assembly of claim 1 wherein said body and said neck form a unitary structure.

3. The bracket assembly of claim 1 wherein an outer diameter of said neck varies along a length of said neck.

4. The bracket assembly of claim 1, further comprising a first rib extending from said inboard side of said body to a first point on said neck distant from said body.

5. The bracket assembly of claim 4 wherein a depth of said first rib continually increases moving from said body to said first point on said neck.

6. The bracket assembly of claim 4 wherein said brake spider mounting bracket further comprises a second rib extending from said inboard side of said body to a second point on said neck distant from said body.

7. The bracket assembly of claim 6 wherein said first and second ribs are circumferentially spaced less than one hundred and eighty degrees from one another about said neck.

8. The bracket assembly of claim 6 wherein said first and second ribs are not identical in shape.

9. The bracket assembly of claim 1 wherein said brake spider mounting bracket is joined to said tube with a weld at an outboard end of said neck.

10. The bracket assembly of claim 1 wherein said neck encircles said tube.

11. A brake and bracket assembly, comprising:
 a brake assembly, comprising:
  a brake spider;
  first and second brake shoes having first ends coupled to said brake spider; and,
  a camshaft extending through said brake spider and having a cam at a first end configured to engage second ends of said first and second brake shoes, rotation of said cam causing said first and second brake shoes to move between positions of engagement and disengagement with a braking surface; and,
 a bracket assembly for receiving said brake assembly and a brake actuator, comprising:
  a tube configured to receive said camshaft;
  an actuator mounting bracket disposed proximate a first end of said tube, said actuator mounting bracket configured for coupling to said actuator and defining an aperture configured to receive said tube; and,
  a brake spider mounting bracket disposed proximate a second end of said tube, said brake spider mounting bracket including:
   a body defining inboard and outboard sides, said body configured to receive said brake spider on said outboard side and defining an aperture configured to allow said tube to extend therethrough; and,
   a neck extending from said inboard side of said body, said neck configured to receive said tube
  wherein said brake spider mounting bracket is joined to said tube with a weld at an inboard end of said neck distant from said body and said neck is not welded to said body.

12. The brake and bracket assembly of claim 11 wherein said body and said neck form a unitary structure.

13. The brake and bracket assembly of claim 11 wherein an outer diameter of said neck varies along a length of said neck.

14. The brake and bracket assembly of claim 11, further comprising a first rib extending from said inboard side of said body to a first point on said neck distant from said body.

15. The brake and bracket assembly of claim 14 wherein a depth of said first rib continually increases moving from said body to said first point on said neck.

16. The brake and bracket assembly of claim 14 wherein said brake spider mounting bracket further comprises a second rib extending from said inboard side of said body to a second point on said neck distant from said body.

17. The brake and bracket assembly of claim 16 wherein said first and second ribs are circumferentially spaced less than one hundred and eighty degrees from one another about said neck.

18. The brake and bracket assembly of claim 16 wherein said first and second ribs are not identical in shape.

19. The brake and bracket assembly of claim 11 wherein said brake spider mounting bracket is joined to said tube with a weld at an outboard end of said neck.

* * * * *